Feb. 10, 1931.  S. R. HOWARD ET AL  1,791,963
CARTON FORMING MACHINE
Filed March 12, 1926  4 Sheets-Sheet 1

INVENTORS
Arthur Clarence Everett
Stanley R. Howard
BY
J. Stanley Churchill
ATTORNEY.

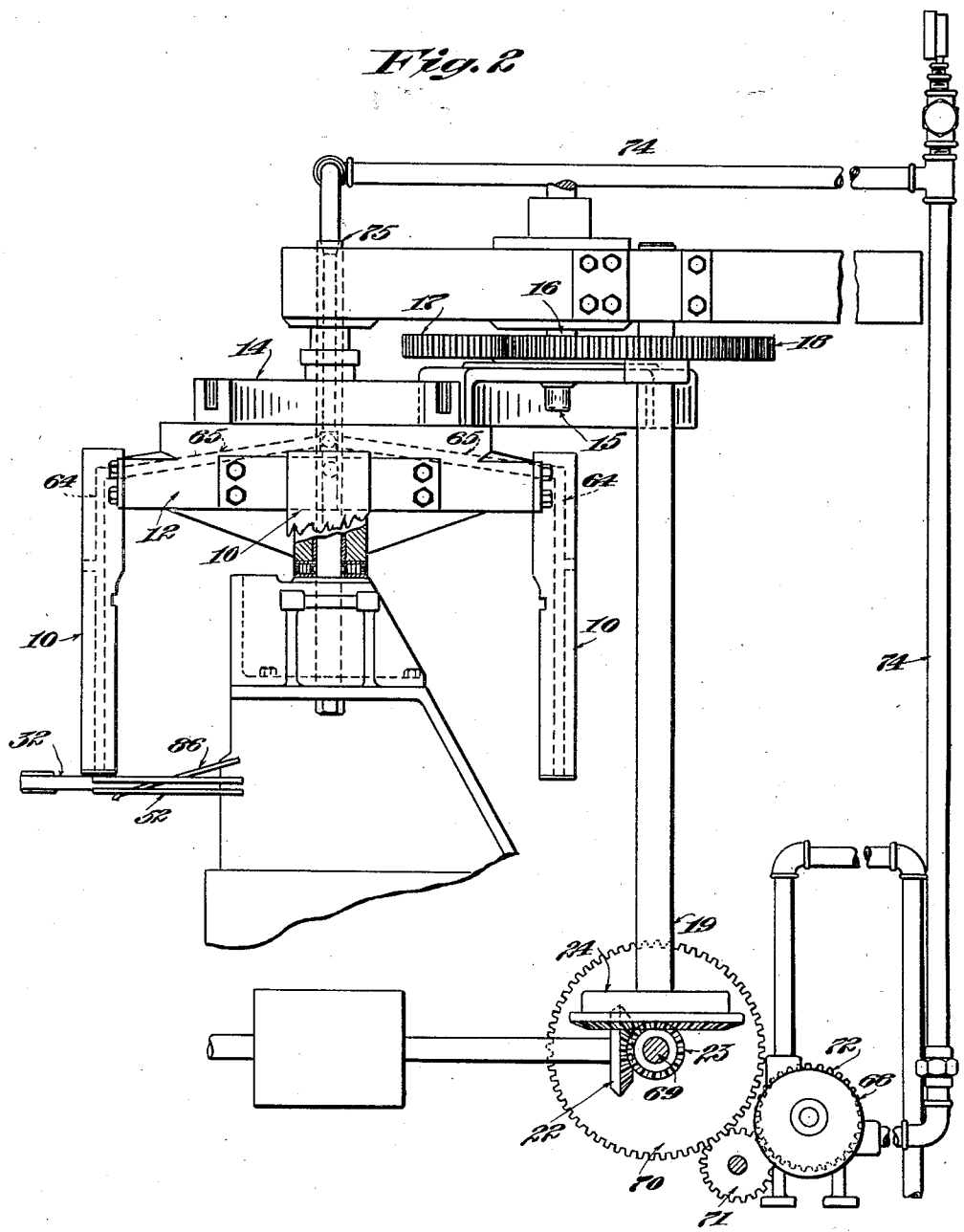

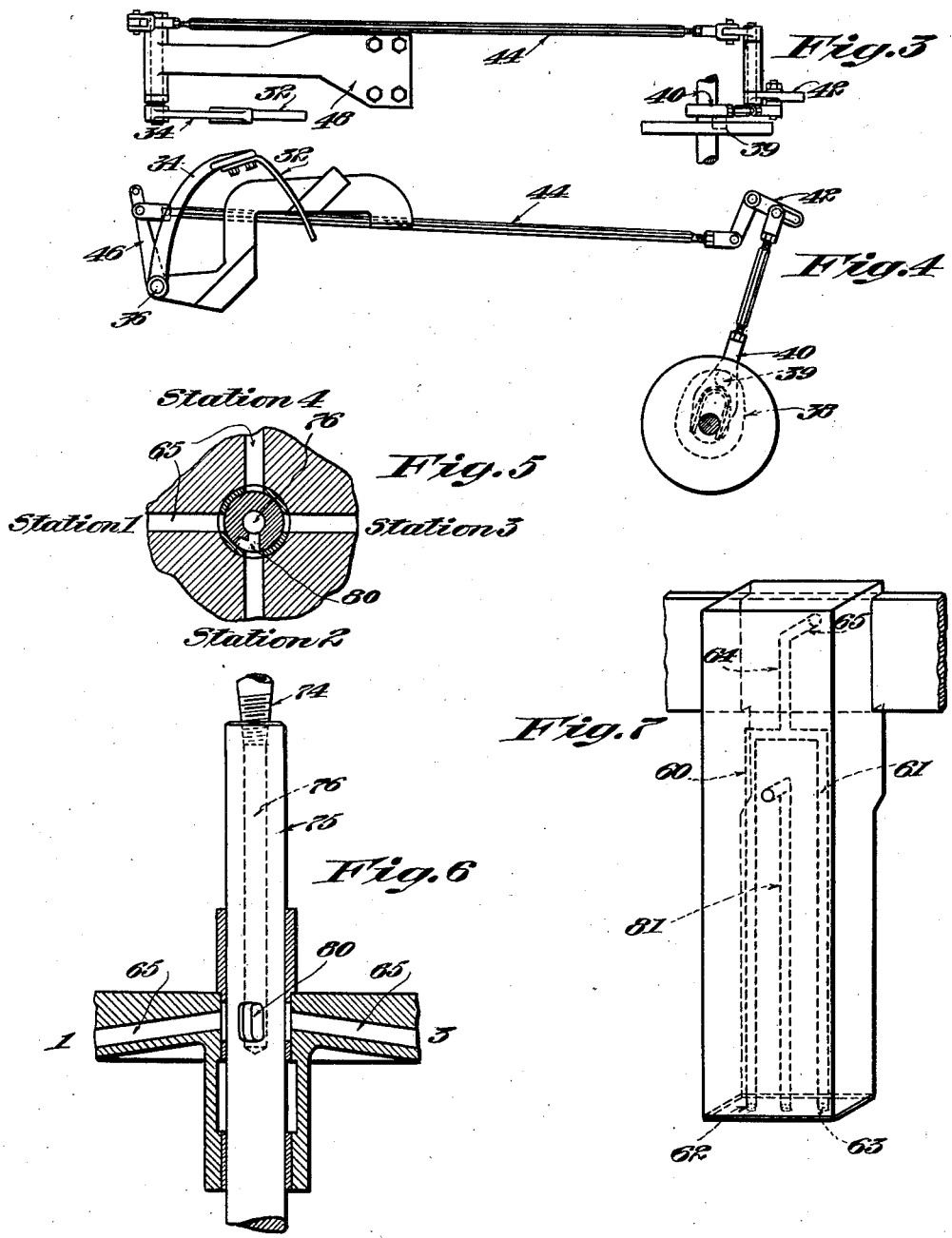

Feb. 10, 1931.  S. R. HOWARD ET AL  1,791,963
CARTON FORMING MACHINE
Filed March 12, 1928    4 Sheets-Sheet 4

INVENTORS
Arthur Clarence Everett
Stanley R. Howard
BY
J. Stanley Churchill
ATTORNEY Patented Feb. 10, 1931

1,791,963

UNITED STATES PATENT OFFICE

STANLEY R. HOWARD, OF EAST MILTON, AND ARTHUR CLARENCE EVERETT, OF BOSTON, MASSACHUSETTS, ASSIGNORS TO PNEUMATIC SCALE CORPORATION, LIMITED, OF QUINCY, MASSACHUSETTS, A CORPORATION OF MASSACHUSETTS

CARTON-FORMING MACHINE

Application filed March 12, 1928. Serial No. 261,097.

This invention relates to a carton forming machine and as herein shown is embodied in a machine for closing and sealing the bottom flaps of cartons.

The object of the invention is to provide a machine of the character specified of novel and improved construction and possessing a novel mode of operation, which is adapted for operation at much higher speeds than similar carton forming machines at present upon the market.

A further object of the invention is to provide a machine for closing and sealing the bottom flaps of cartons which is of novel, simplified and improved construction and particularly adapted for high speed operation.

With these objects in view the invention consists in the machine and in the structures, arrangements and combinations of parts hereinafter described and particularly defined in the claims at the end of this specification.

Figure 1:
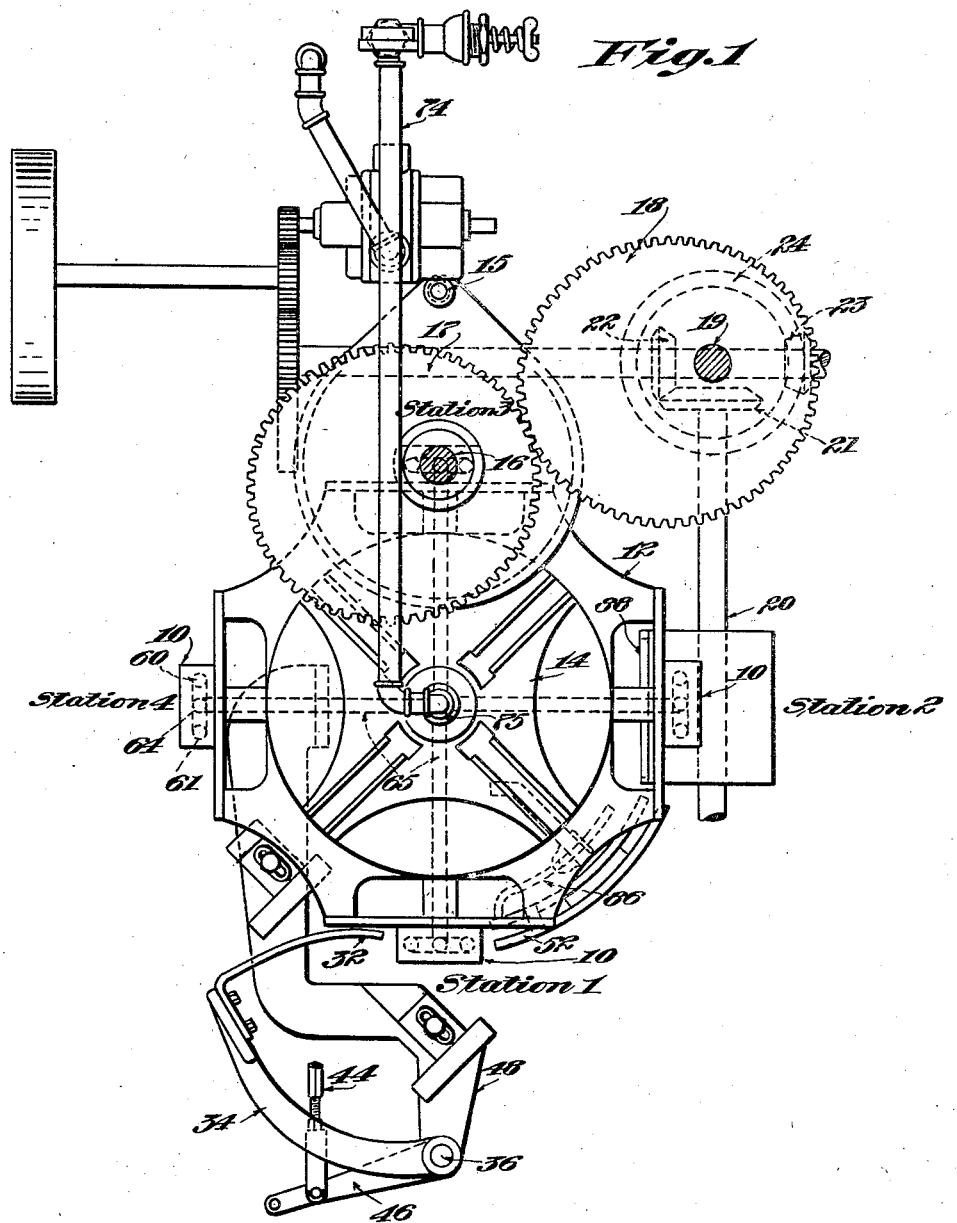
Figure 6:
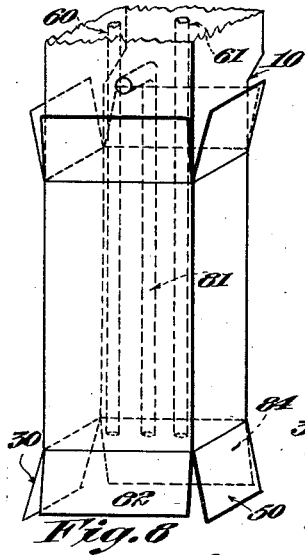

In the drawings illustrating the preferred form of the invention, Figure 1 is a plan view of a sufficient portion of a bottom sealing machine embodying the present invention; Fig. 2 is a side elevation with parts broken away of a portion of the machine illustrated in Fig. 1; Figs. 3 and 4 are detailed views in plan and side elevation respectively of the mechanism for folding one of the narrow bottom flaps of the carton; Figs. 5 and 6 are horizontal and vertical sectional details respectively illustrating a portion of the valve mechanism for controlling the supply of suction used in holding the narrow bottom flaps, as will be described; Fig. 7 is a perspective view of one of the forming blocks on which the cartons are mounted during the bottom flap folding and sealing operations; Figs. 8, 9, 10 and 11 are diagrammatic views in perspective illustrating succeeding steps in the operation of folding the bottom flaps of a carton, as will be described; and Figs. 12, 13, 14, 15, 16 and 17 are diagrammatic views illustrative of the successive operations performed in folding and sealing the wider bottom flaps of the carton.

In general, in a carton forming machine embodying the different features of the present invention, provision is made for folding and sealing the bottom flaps of the carton in a novel and simplified manner, which enables these operations to be efficiently performed while permitting the machine to be operated at relatively high speed. For some time machines have been upon the market for sealing the bottom flaps of cartons and the maximum practical operating speed for such machines has been in the neighborhood of thirty cartons a minute. Reference is made to the patent to W. S. Scales No. 767,445, dated August 16, 1904, as disclosing the details of construction and the mode of operation of such prior art bottom sealing machines.

The present machine for folding the bottom flaps of successive cartons is designed to be capable of successful operation at a speed of sixty cartons per minute, and a large part in rendering possible this relatively high speed is played by the features of the present invention pertaining to a novel method of folding the bottom flaps of the cartons and for sealing the same.

Referring now to the drawing, except as to details to be hereinafter pointed out, the illustrated bottom sealing machine preferably comprises the prior art bottom sealing machines illustrated in the Scales patent above referred to and in which successive cartons are placed upon forming blocks 10 by carton feeding mechanism of usual construction (not herein shown) such as is illustrated in said Scales patent, during the time that successive of the blocks 10 are at a station designated as station 1 and with the bottom flaps of the cartons projecting beyond the bottom of the forming block in a position ready to be folded upon the bottom of the block and to be sealed during the subsequent operation of the machine, as will be described. Each forming block 10 is mounted upon a rotatable spider 12, the latter being intermittently rotated through successive angles of 90° to present each block to four successive stations herein designated as stations 1, 2, 3 and 4. The spider is arranged to be intermittently rotated by the usual construction of Geneva drive indicated generally at 14 and the driving roll 15 of the Geneva drive may and preferably will be rotated about the shaft 16 as a center by cooperating elliptical gears 17 and 18. The elliptical gear 17 is mounted upon the shaft 16 and is driven from the gear 18, the latter being mounted upon the shaft 19. The shaft 19 is preferably driven from a main driving shaft 20 through cooperating bevel gears 21, 22, 23, 24 respectively, as shown in Fig. 1.

A carton forming machine in which the intermittent motion is imparted to the rotating spider by means of the elliptical gears 17, 18 forms the subject matter of a copending application filed on even date herewith, and while it is preferred to utilize such gears in connection with the production of the intermittent motion, other forms of driving mechanism may be used.

Figure 9:
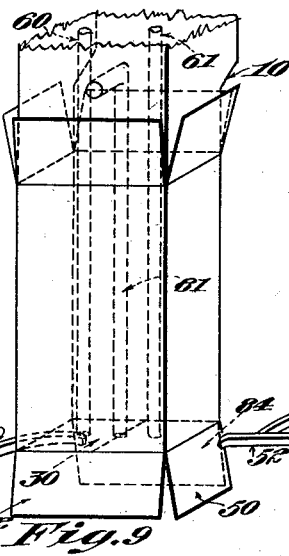
Figure 10:
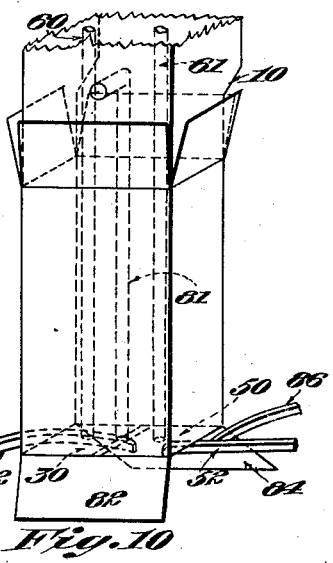
Figure 12:
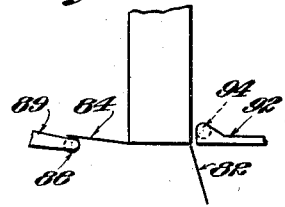
Figure 13:
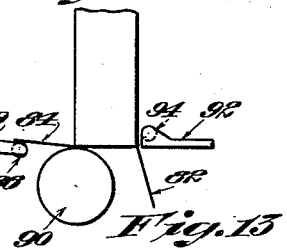

In the operation of the machine as above stated a knock-down carton is first placed upon the forming block 10 while the latter is in the position designated station 1 in Fig. 1. The first step in the operation of folding and sealing the bottom flaps of the carton comprises the folding in of the left-hand narrower flap 30 of the carton by an oscillatory folding arm 32. The arm 32 is mounted upon the end of an arm 34 pivoted on a stud 36, and provision is made for oscillating the arm by connections from a driven cam 38 including a cam roll 39 mounted upon a yoke 40, a bell crank 42, a link 44 and a lever 46 also mounted upon the stud 36, as shown in detail in Figs. 3 and 4. The stud 36 is operatively supported upon the frame of the machine, being mounted in a bracket 48 as shown. In the operation of the machine the arm 32 is preferably arranged so that it commences to fold in the left hand narrow flap 30 immediately after the carton has been placed upon the forming block in the position designated station 1, and thereafter as the forming block moves with the spider during the intermittent movement of the spider to bring the block from station 1 to station 2, the arm 32 continues to move with the block and at a slightly increased speed, being timed so that during the initial movement of the block from station 1 to station 2, after the second narrow flap 50 engages the fixed folding guide 52 and is folded up against the bottom of the block, as illustrated in the details of Figs. 8, 9 and 10, the folding arm 32 will hold both of the flaps 30, 50 against the bottom of the block until such time as the block will have moved to cause the fixed guide 52 to engage and hold both of the flaps 30, 50.

These operations take place during the movement of the block through approximately the first half of its travel from station 1 to station 2. Thereafter the folding arm 32 is returned to a position such as is illustrated in Fig. 1 by the operation of the cam 38.

Provision is made for holding the flaps 30, 50 in their position against the bottom of the forming block by means of suction during the subsequent sealing and folding operations, and as herein shown suction is supplied for this purpose through suction pipes 60, 61 located within the forming block, and having the ends 62, 63 thereof open and located in the plane of the bottom of the forming block. The suction pipes 60, 61 are connected at their upper ends to a common pipe 64 which is connected to a conduit 65 formed in each arm of the spider 12. Suction is supplied to each branch 65 and thence to each suction pipe 60, 61, from a suction pump represented generally at 68 in Fig. 2 of any usual or preferred construction herein shown as driven from the driven shaft 69 through the gear trains 70, 71, 72. The suction side of the suction pump 68 is connected by the piping 74 to the upper end of the shaft 75 upon which the spider 12 is mounted. The shaft 75 has a drilled hole 76 therein with which the piping 74 communicates and the shaft 75 is provided with a valve port 80, as shown in detail in Figs. 5 and 6, for connecting the drilled hole 76 with the particular conduit 65 brought into register therewith as the spider rotates. With the arrangement shown the valve 80 comes into register with the passage 65 in any particular arm of the spider at a point approximately one-half of the travel of the block from station 1 to station 2, and suction is therefore supplied to the suction pipes 60, 61 from such point until the block has left station 2.

Each block 10 is also preferably provided with an auxiliary pipe 81 connecting with the exterior of the block, and through which air may be drawn to break the suction effect between the bottom of the carton and the block, when the carton is to be ejected from the block at the ejecting station No. 4.

Figure 11:
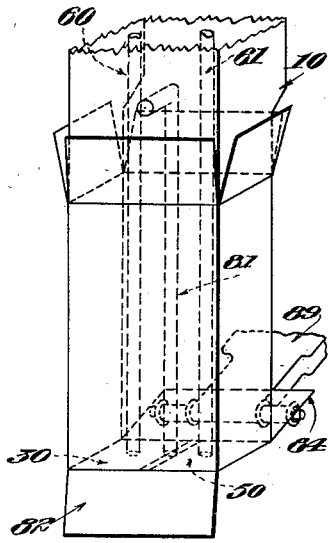
Figures 14, 15:
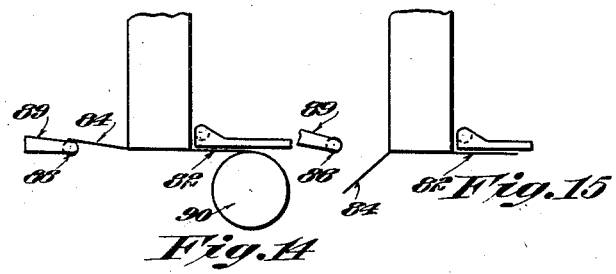
Figure 16:
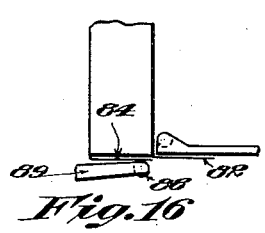
Figure 17:
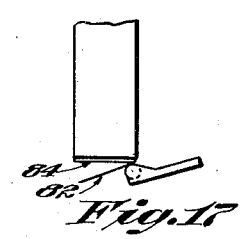

In order to prepare the wider flaps 82, 84 for the application of adhesive, a guide member 86 (see Figs. 9 and 10) is arranged to cause the innermost wider flap 84 to be bent outwardly during the traverse of the block and carton from station 1 to station 2, and in arriving at station 2 the flap 84 is caused to pass over a folding roll 88 and to be supported in a substantially horizontal position by the folding roll 88 in a position such as is illustrated in Fig. 11. The folding roll 88 is mounted upon an arm 89 which is actuated by suitable cam mechanism (not shown) to cause the roll 88 to be positioned to hold the flap in the position illustrated in Fig. 11, and to subsequently fold the flap, as will be described, onto the previously folded narrow flaps. When the carton and block arrive at station 2 the parts are in the position diagrammatically illustrated in Fig. 12, and provision is then made for the application of adhesive so that when the wider flaps are subsequently folded upon the previously folded narrower flaps, the former may be securely affixed to the latter and the bottom of the carton sealed. For the application of the adhesive and for folding over the wider flaps, any of the known forms of flap folding mechanism may be used, and as diagrammatically represented in Fig. 13, provision is made for raising the usual form of glue roll 90 into engagement with the folded narrower flap 30, the wider flap 84 being held out of the way by the roll 88. The glue roll is then caused to wipe across the bottom surfaces of the flaps 30, 50 and across the inner surface of the front wider flap 82 in the manner illustrated in Fig. 14. During the application of the adhesive the flap 82 is supported by the under surface of a folding arm 92, the latter carrying a folding roll 94 as illustrated in Fig. 14. Thereafter the glue roll withdraws and the folding roll 88 is caused by its cam to recede slightly, permitting the flap 84 to fall into a position such as is illustrated in Fig. 15. Thereafter the roll 88 is actuated to fold in the flap 84 into the position illustrated in Fig. 16 and the final step in the folding and sealing operation is performed by the folding roll 94 in the manner illustrated in Fig. 17.

After the folding and sealing operations have thus been performed while the carton remains at station 2, the block and the carton are then intermittently rotated to present the block to station 3 where the usual pressing operation is performed by mechanism (not shown) and thereafter the block is moved to station 4 where it is ejected from the block and from the machine by the usual ejecting mechanism.

From the foregoing description, it will be observed that the provision of the suction actuated means for holding the flaps 30, 50 against the bottom of the folding block enables these flaps to be folded against the block by mechanism which is adapted for high speed operation of the machine, with a minimum amount of operating difficulty. In the carton sealing machines of the prior art, the reciprocatory folding and flap holding devices were found to give a great amount of trouble when an attempt was made to speed up the machine.

While the present invention lends itself particularly for use in a high speed carton sealing machine, it may be used with advantage in any carton sealing machine.

Having thus described the invention what is claimed is:—

1. In a carton forming machine, in combination, a plurality of forming blocks, means for intermittently rotating the forming blocks to present them to successive stations, mechanism for folding two of the bottom flaps against the bottom of the forming block, suction operated means for holding the flaps in the position into which they are thus folded, a gluing device for thereafter applying adhesive to the unfolded flaps, and means for folding and pressing the remaining flaps.

2. In a bottom sealing machine, in combination, a carton holding device, means for folding one set of bottom flaps, suction operated means for holding said flaps, and means for folding and adhesively affixing the second set of flaps to the first set of flaps.

3. In a bottom sealing machine, in combination, a plurality of carton holding devices, means for intermittently rotating the same, mechanism operative upon successive cartons for successively folding in one of the bottom flaps thereof, a fixed member adapted to fold in the opposite flap of such carton during the rotation of the carton holding device, and suction operated means for holding said folded flaps until the remaining flaps have been folded thereon.

4. In a carton forming machine, in combination, a plurality of forming blocks, means for intermittently rotating the forming blocks, means for folding in one set of the bottom flaps of a carton supported upon said forming block, and suction operated means for holding said flaps against the bottom of the forming block including a pair of suction pipes extending through each forming block with the ends open and terminating substantially in the plane of the bottom of the block, a suction pump, and piping connections to said suction pipes including a control valve for controlling the supply of suction to the pipes.

5. In a carton forming machine, in combination, a plurality of forming blocks, means for intermittently rotating the forming blocks, means for folding in one set of the bottom flaps of a carton supported upon said forming block, and suction operated means for holding said flaps against the bottom of the forming block including a pair of suction pipes extending through each forming block with the ends open and terminating substantially in the plane of the bottom of the block, a suction pump, piping connections to said suction pipes including a control valve for controlling the supply of suction to the pipes, and mechanism for folding and adhesively affixing the remaining set of flaps to said folded flaps.

6. In a machine for folding and sealing the end flaps of a carton, in combination, a forming block upon which the body of the carton is supported with the sides of the carton in engagement with the sides of the forming block and with one set of end flaps projecting beyond an end of the block, folding devices for folding one pair of such end flaps, suction means for holding such folded end flaps in their folded position, and means for thereafter folding the remaining of such end flaps and adhesively affixing them to the first folded flaps.

7. In a carton forming machine, the combination with a carton holder, of means for folding one set of end flaps at one end of the carton, suction means cooperating directly with the end flaps thus folded for holding the flaps in their folded position, and means for thereafter folding the second set of end flaps at said end of the carton to thereby close the end of the carton.

STANLEY R. HOWARD.
  ARTHUR CLARENCE EVERETT.